Jan. 23, 1923.

S. M. DE PROCOUDINE-GORSKY.
THREE-COLOR PHOTOGRAPHY.
FILED FEB. 23, 1921.

1,443,012.

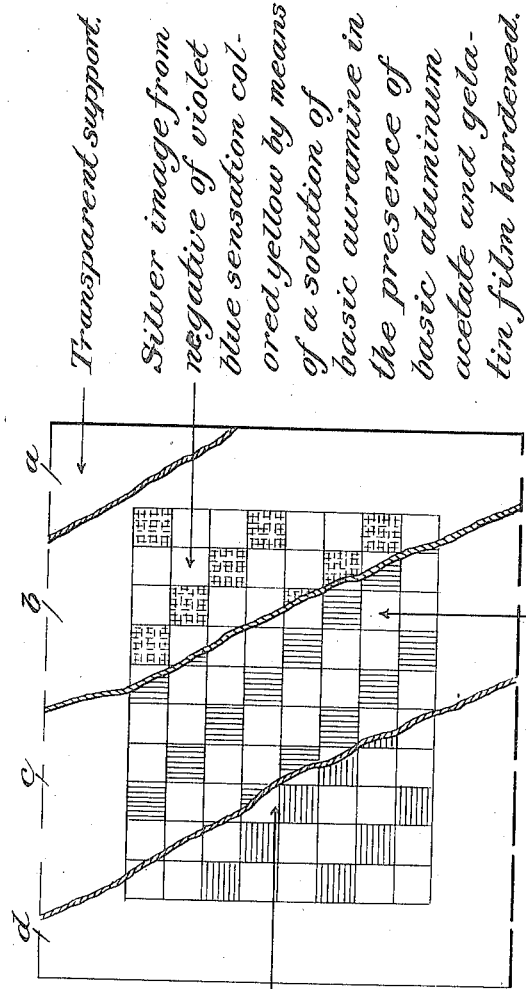

Transparent support.

Silver image from negative of violet blue sensation colored yellow by means of a solution of basic auramine in the presence of basic aluminum acetate and gelatin film hardened.

Image from negative of green sensation colored red by means of a solution of rodamine in presence of acetic acid.

Image from negative of yellow sensation toned or colored blue by treatment with a solution of potassium ferricyanide and ammonia, then immersing in a solution of ferric chloride and then in a solution of sodium thiosulphate and finally in sulphuric acid.

Inventor:
S. M. de Procoudine-Gorsky
By Lawrence Langner
Att'y.

Patented Jan. 23, 1923.

1,443,012

UNITED STATES PATENT OFFICE.

SERGE MICHAEL DE PROCOUDINE-GORSKY, OF SUTTON, ENGLAND.

THREE-COLOR PHOTOGRAPHY.

Application filed February 23, 1921. Serial No. 447,232.

*To all whom it may concern:*

Be it known that I, SERGE MICHAEL DE PROCOUDINE-GORSKY, a citizen of Russia, and residing at the Dell, Croft Road, Sutton, in the county of Surrey, England, have invented certain new and useful Improvements in and Relating to Three-Color Photography, of which the following is a specification.

This invention relates to the production of coloured positive pictures for use in optical lanterns or as kinematograph films and the like, and has for its object an improved method for the production of such positive pictures. Such coloured positive pictures have been described in my British patent specification No. 135,161, filed July 26, 1919, application No. 18,585.

Hitherto the following two methods have usually been employed for the production of coloured positive pictures:—

(1) Three separate monochromatic pictures or films produced from three negatives taken through suitable color screens are brought into registration and united by adhesion.

(2) The transparent coloured elements forming the color screen are attached to the emulsion support and coated with an emulsion. The emulsion is exposed through the color screen and the pictures obtained in the complementary colors by a photographic process are converted into pictures of the correct color by suitable treatment.

These processes are not suitable for the production of pictures on a large scale and may be considered more or less unsatisfactory for instantaneous or other high speed photography. Moreover, the positives obtained are of low transparency and necessitate the use of high power illuminants for optical projection purposes. Generally, the kinematograph films produced by the above and like methods are of undue thickness and necessitate the use of special optical means in order to avoid the disturbing influence of the thickness of the films and their support. To assist projection matters it is advisable that the coatings of emulsion be only on one side of the celluloid or other support.

In carrying the process hereinafter described into effect it is advisable to avoid the use of a resist or protective stratum between two emulsions on the positive film. The protective stratum can be eliminated in the manner hereinafter described. This is of great advantage because the images are more transparent owing to the thickness of the film being considerably less and because the layers of gelatine adhere to the previous coating much better.

By the process hereinafter described it is possible to produce without difficulty and on a manufacturing scale transparent coloured positive pictures for optical projection.

The invention consists in the production of coloured positive pictures from three negative members corresponding to the three "primary" colors selected by producing from one of the negative members an ordinary black positive which is converted into a lac-like transparent image of the corresponding complementary color, coating the resulting image with a positive emulsion, producing from the second negative member an image on the said coating in register with the first image, and converting it into a transparent positive of the second "primary" color, applying a positive emulsion thereto, printing thereon a positive from the third negative member and converting same into an image of the third "primary" color.

The invention also consists in a positive for producing images in natural colors without the aid of independent color screens or filters or the use of optical means to avoid the disturbing influence of the thickness of the coatings and their support.

The invention also consists in a positive for producing images in natural colors, comprising thin lac-like coloured images separated by a protective stratum, the said protective stratum consisting of a layer of a 1% solution of rubber in benzol, and a layer of a 2% solution of celluloid in acetone.

The invention consists in a coloured positive picture produced in accordance with a three-color system of photography in which there is no protective stratum between the thin lac-like coloured images.

The invention consists in a method of eliminating the protective stratum between the thin lac-like coloured images in which the layer of emulsion is covered with a gelatine solution to which has been added a small proportion of a hardening solution and dried before coating with the next layer of sensitive emulsion.

The invention consists in a method of eliminating the protective stratum between the thin lac-like coloured images in which the layer of gelatine bearing the image is itself treated with a hardening solution, well washed and then coated with the next layer of sensitive emulsion without drying.

The invention consists in a coloured positive picture treated as above having a final protective coating of rubber and celluloid.

The invention consists in increasing the sensitivity of a negative emulsion treated with ethyl-red by thoroughly washing it to remove all traces of the dye and rapidly drying it to prevent oxidation.

The invention also consists in a positive for producing images in natural colors, wherein the positive images from the negative of violet-blue sensation are coloured yellow by means of a solution of basic auramine in the presence of basic aluminium acetate.

The invention consists in a coloured positive picture produced according to the three color system of photography in which the coatings of sensitive emulsion are situated on one side of the support only.

The invention also consists in the production of color positives for optical lanterns, kinematographs and other purposes substantially as hereinafter described.

The invention is illustrated in the accompanying drawings in which the figure represents a face view of a positive film comprising a transparent base $a$, with successive coatings $b$, $c$ and $d$ carrying positive images from the negatives taken through the three selective color screens. The drawing bears self-explanatory legends.

In carrying this invention into effect in one form, a support which in the case of kinematographic work is a transparent flexible band of celluloid or other material is provided for a negative photographic emulsion of a suitable speed and of such sensitivity that when panchromatized it may be characterized by its practical equality of sensitivity to the red, orange, yellow and green rays of the solar spectrum.

In order to sensitize the emulsion in the most effective manner I apply a compound of the type of ethyl-red (quinaldinquinolinethylcyanin iodide) as described by Professor Miethe. It is also possible to use ethyl-red which is soluble in water and alcohol. In dilute solution (1:50,000) it sensitizes silver bromide gelatine emulsion uniformly from the red (C) to the violet with only a minimum in the green; it does not sensitize far into the red. The ethyl-red may be used under the condition that the drying of the layer should proceed as rapidly as possible in order to avoid oxidation which especially affects cyanine and which causes the color sensitivity to rapidly fall. In addition to that the washing after the sensitizing process must be very thorough and continuous in order to remove all traces of the dye from the layer as to a great extent the degree of sensitiveness depends upon this thorough washing. An efficient sensitizer must actually dye the silver halide grain and not merely stain the emulsion.

The negative emulsion, now hereinafter referred to as the negative film, is exposed by means of a kinematograph camera fitted with the requisite light filters and capable of working at a speed of 48 or more pictures per second for prolonged periods. For taking motion pictures in daylight, three light filters are used each representing a part of the solar spectrum, and the three together, the whole solar spectrum. It should be borne in mind that other filters must be used for the different artificial illuminants and that the subject must be illuminated by one kind of light only, that is to say, it will not do to have the subject partly illuminated by daylight and partly by artificial light, or even by two different artificial lights. In practice it has been found convenient to produce a series of images upon the negative film at the rate of 48 images per second, each serial element of which comprises three successive images of orange, green and violet-blue color sensations respectively.

To obtain final pictures true to natural colors I find that the three light filters have to be very carefully chosen. The first of the light filters which I use passes all the red, orange and yellow rays of the solar spectrum; the second all the rays of the solar spectrum having a wave length of 500–600 $\mu\mu$, that is the green part of the spectrum; the third color screen or light filter passes the rest of the solar spectrum, that is the blue, indigo and violet rays and also the ultra-violet rays. The blue rays must not be allowed to pass through the green light filter as is often considered permissible in commercial filters. The ultra-violet rays, unseen to the eye very energetically attack the silver bromide in the photographic emulsion, and it is for this reason that it is necessary to vary the exposure through the different light filters.

In order to give the correct values to the three colors during exposure it is imperative to put a light filter either in front or behind the objective so as to reduce the excessive action of the blue end of the spectrum. If no filter at all is used or non-filtered white light gets access to the plate the final image will appear throughout of a violet-blue color. Moreover, any ordinary yellow screen will not give the correct values, in fact the attainment of the correct color is one of the difficulties which all makers have to overcome, since not only must the ultra-violet rays be absorbed but the correct portion of the spectrum colors must be arrived at so as to get the right balance of colors. It will be found that it is necessary to give the violet screen only a very small opening.

This is often undesirable and it has been found that the surplus effect of ultra-violet rays in some cases greatly affects the quality of the image, especially the coloured part, such as the horizon, the sky and all objects on the horizon, all of which are not distinct. In these parts the negative contains too much reduced silver as compared with the image of the foreground; this applies particularly to sea views. In order to overcome these difficulties a trough of quinine sulphate may be used, but as this is inconvenient in kinematograph work I use in conjunction with the screen passing the ultraviolet rays an æsculin screen which is superior to a screen of β-naphtholdisulphonic acid as the latter is only moderately stable to the action of light. The æsculin, however, must be very pure and should if possible be of the kind produced by Doctor E. König, for if the æsculin is slightly impure it goes brown when cemented with Canada balsam to other screens.

The effect of a filter placed behind the lens is to lengthen out the focus one third that of the thickness of the filter. If the filter is in front of the lens, as it may be in the case of ordinary photography, but not so conveniently in the production of motion pictures, it will have no effect on the focus if the object is some distance from the lens, that is, if the lens is in focus near the infinity mark. To overcome any difficulties due to focusing a dummy filter may be used. This consists of a filter of plain gelatine cemented between glass of given thickness so that the filter matches in optical qualities any other filter required to be used for the actual exposure but through which it is too dark to focus.

The exposed negative film is developed, fixed and washed after which a positive film is made in the following manner: From the negative film the pictures first printed upon the positive film are those exposed through the violet-blue light filter. The printing machine is adapted in such manner that the print of every successive image of like color sensation on the negative film, which is separated by images of other color sensations, is printed on the positive film in a contiguous and successive series of images of like color sensations. When the positive film has received images of like color sensation as hereinbefore described, has been developed in the usual manner, and dried, it has to be of the complementary color to the light filter through which the negative image was taken. That is to say, the positive images from negatives exposed under the violet-blue filter must be coloured yellow; those positive images from negatives exposed under the red or orange filter must be coloured blue and those positive images from negatives exposed under the green filter must be coloured red. In short, the color of each positive image must be substantially complementary to the color of the filter used in taking the negative.

In the present instance the positive image of violet-blue color sensation having been made first, the positive film is to be coloured yellow. It is dipped into a solution of potassium ferricyanide to which has been added a solution of potassium iodide and ammonium hydrate. Upon immersion in this solution the metallic silver of the image is converted partly into silver iodide and partly into silver ferro-cyanide. About three minutes is the average time required for this operation. The film is now washed for about five minutes in running water and then dipped into a solution of basic auramine in the presence of acetic acid and basic aluminium acetate. The solution of the latter salt should be freshly prepared as it is of the greatest importance for the purpose of obtaining a lac-like substance. It has been ascertained that of all the yellow dyestuffs, basic auramine if used in the manner hereinbefore described is the only one which does not lose depth of tone in color when being washed and gives a correct color rendering. The use of this dyestuff is considered a most important part of the process as it involves the formation of a lac-like substance formed by the action of basic auramine on silver iodide and silver cyanide which is "fixed" in the presence of basic aluminium acetate. The process takes about five to eight minutes according to the density of the image. By means of a second washing in running water the superfluous dyestuff is removed while a certain part of silver iodide remains untransferred into the lac-like substance as experience shows that in this process a certain part of the silver remains unchanged, causing a certain opalescence of the image and does not enter into the formation of the lac-like substance. All clear parts of the gelatine should be absolutely transparent and the dyestuff used must be totally removed by the washing. The positive film is further washed in a solution of tannin and glycerine, whereby the whole gelatine coating is tanned by the tanning and the glycerine renders the layer elastic; the latter being of importance during the subsequent manipulation of the film. The operation takes about five minutes. The positive film is then transferred into a fixing solution which removes the small remaining quantity of silver iodide which is not converted into metallic silver and makes the film absolutely transparent; the image remaining a golden yellow color. The said fixing solution comprises sodium thiosulphate in the presence of some of the tanning solution (that which adheres to the film) which prevents the sodium thiosulphate from immediately and unequally removing the silver iodide. The film is now washed and dried.

In order that the coloured positive film may be protected when necessary from any subsequent chemical manipulations it may be coated upon the emulsion side with a protective stratum comprising a very thin but solid layer of a 1% solution of rubber in benzol. Following this the emulsion side of the positive film is coated with a solution of 2% of celluloid in acetone. A very thin layer which resists any of the applied solutions may be obtained by spraying the said solutions on to the positive film by means of an aerograph. When a protective stratum is used it has been found absolutely necessary to use coatings of both solutions, as if only one of them is applied the coating is permeable even in thick layers.

A coating of rubber and celluloid is, however, not necessary between layers of emulsion in the positive film if the gelatine in the emulsion is treated with potash alum, chrome alum, formalin or other hardening solution, but it is absolutely imperative that if the substance cannot be washed entirely away or its effects not otherwise eliminated, the substance must not have any influence on the lac-like substance of the image, or the following coatings of sensitive emulsion. If desired, however, the film may be finally coated with layers of rubber and celluloid in the manner hereinbefore described. There are two ways in which I treat the film with the hardening solution. The first method is that the coating of emulsion is covered with a gelatine solution to which has been added a small proportion of a hardening solution; this may be applied by means of a coating machine; the gelatine coating is then dried and the film is then coated with the next layer of emulsion. The second method is that the layer of gelatine bearing the images is itself treated with a hardening solution, well washed to eliminate the hardening solution and coated directly with the next sensitive emulsion without the drying of the treated gelatine coating. In using gelatine hardening substances care must be taken to counteract the swelling of the gelatine. This may be done by known methods.

Following the protection or hardening of the yellow coloured positive images the positive film is now coated on the same side by machinery with a positive emulsion of a kind which permits the easy action of the solutions from one side, gives a stable layer and a sufficient quantity of silver iodide for the formation of a lac-like coloured image. The negative images taken through the green light filter are now printed upon the positive film by means of a printing machine adapted as hereinbefore described. The manipulation of the positive film is now similar to that hereinbefore described with reference to the positive images printed from the negatives of violet-blue color sensation, the difference being that the film is coloured red with a solution of rodamine in the presence of acetic acid.

The printing of positive images from the negative of the orange color sensation is the last printing operation to be carried out by the printing machine hereinbefore referred to, the impression of the said images being made upon the coating of the characterized sensitive positive emulsion directly coated upon the hardened red coloured positive film, or upon a coating isolated therefrom by means of a protective stratum. The images so obtained are then treated by a solution of potassium ferricyanide and ammonia, washed in running water, dipped into a solution of ferric chloride, dipped into a solution of sodium thiosulphate and finally dipped into dilute sulphuric acid. After washing and drying, the positive film receives a final protective coating.

From the foregoing it will be observed that the process is of great practical consequence because it affords an exceedingly thin and transparent film which does not scale under the action of heat and which may be projected on to the screen from standard kinematograph apparatus at the normal speed of 16 pictures per second.

Having now described my invention, what I claim as new and desire to secure by Letters Patent is:—

1. A process for the production of fully coloured positive images from negatives separately taken through color screens, in which the positive images from the negatives of violet blue sensation are coloured yellow by means of a solution of basic auramine in the presence of basic aluminium acetate.

2. A process according to claim 1, in which the positive images from the negative of green sensation are coloured red by means of a solution of rodamine in the presence of acetic acid, and the positive images from the negative images of yellow sensation are toned or coloured blue by treatment with a solution of potassium ferricyanide and ammonia, then immersing in a solution of ferric chloride and then in a solution of sodium thiosulphate, and finally in sulphuric acid.

3. A process according to claim 2, in which the use of a protective stratum between the component positives is avoided by treating the layer of gelatine bearing the image upon which the next image is to be superposed with a hardening solution, well washing and then coating the next layer of sensitive emulsion without drying.

In testimony whereof I have signed my name to this specification.

SERGE MICHAEL de PROCOUDINE-GORSKY.